United States Patent [19]

Mosher et al.

[11] Patent Number: 5,270,495
[45] Date of Patent: Dec. 14, 1993

[54] COMBINATION WEIGHING MACHINE WITH FEED CONTROL

[75] Inventors: Oren A. Mosher, Castro Valley; Ellwood S. Douglas, Orinda, both of Calif.

[73] Assignee: Package Machinery Company, Stafford Springs, Conn.

[21] Appl. No.: 843,388

[22] Filed: Feb. 28, 1992

[51] Int. Cl.⁵ .............................................. G01G 13/16
[52] U.S. Cl. ........................ 177/25.18; 177/DIG. 11
[58] Field of Search ................. 177/1, 25.18, DIG. 11

[56] References Cited

U.S. PATENT DOCUMENTS

| | | | |
|---|---|---|---|
| 4,360,070 | 11/1982 | Hirano | 177/25.18 |
| 4,466,500 | 8/1984 | Mosher et al. | 177/25.18 |
| 4,534,428 | 8/1985 | Mosher et al. | 177/1 |
| 4,574,849 | 3/1986 | Fukunda . | |
| 4,658,919 | 4/1987 | Nobutsugu | 177/25.18 X |
| 4,664,200 | 5/1987 | Mikami et al. | 177/25.18 |
| 4,995,467 | 2/1991 | Niemann | 177/25.18 |

*Primary Examiner*—George H. Miller, Jr.
*Attorney, Agent, or Firm*—McCormick, Paulding & Huber

[57] ABSTRACT

A combination weighing machine has a plurality of weigh scales for weighing quantities of product, and the scales are selectively dumped and loaded in a cyclic operation to form a package containing a number or weight of product that closely approximates a target amount. The machine includes a plurality of feeders and corresponding accumulators that are associated respectively with the scales for loading product into the scales after they are dumped. To ensure a more accurate feeding of product to a scale, a sensor is provided for detecting the pieces of product as they are loaded into the associated accumulator from a feeder, and the feeder is regulated in accordance with the pieces of product detected to control the duration of feeder operation.

21 Claims, 5 Drawing Sheets

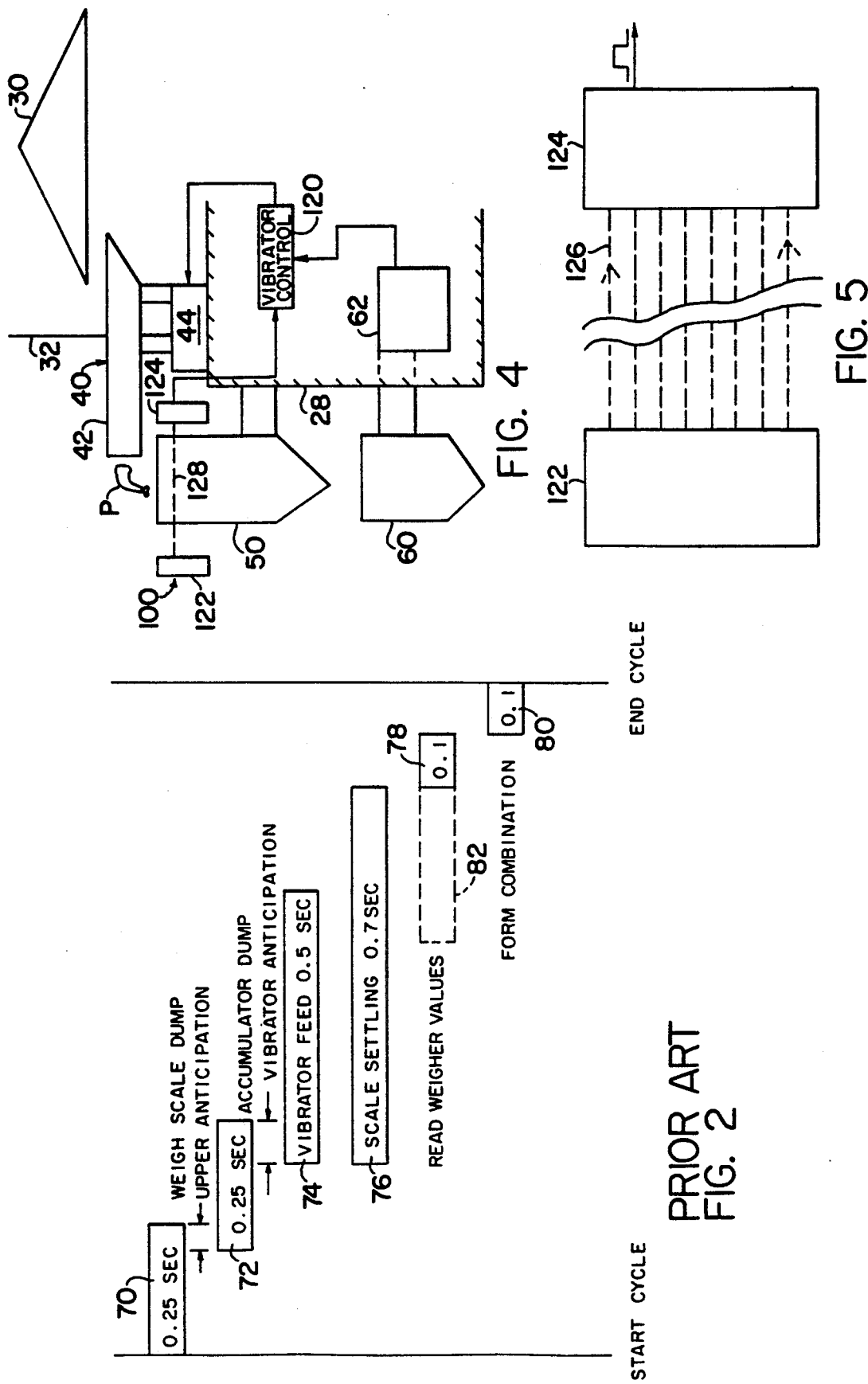

COMBINATION WEIGHING MACHINE WITH FEED CONTROL

BACKGROUND OF THE INVENTION

The present invention relates to a combination weighing machine, and is concerned in particular with the feeding of product from a bulk container into the individual weigh scales of the machine.

In U.S. Pat. No. 4,534,428 having the same inventors and assignee as the present invention, a control system is disclosed for regulating the amplitude and duration of vibratory feeders in a combination weighing machine. The feeders receive product from a bulk container or hopper at the top of the machine and distribute the product to the individual weigh scales as needed. The feeders are excited or vibrated with a controlled amplitude for a controlled period of time in order to feed a coarsely metered quantity of product into an accumulator that is associated with a specific weigh scale. Each of the weigh scales in the machine is fed in this manner. During each cycle of the machine the scales containing product are surveyed and the machine controller selects and dumps that combination of scales which produces a total amount of product that most closely approximates a targeted amount. The dumped scales are then refilled from their respective accumulators, and the accumulators are resupplied with product by their associated vibratory feeders.

The targeted amount of product may be specified as either a selected number of product pieces or a selected total weight of product. In the event that a targeted number of products pieces is sought, the weight signals from the individual scales are converted to whole numbers based upon a standard unit weight for one product piece of product, and then the combinations are formed based on the whole numbers. The technique, however, is error prone if the product pieces do not have a generally uniform weight.

With dry, fine divided, homogeneous and fluid-like products such as sugar or salt, peanuts, cereal flakes and small candies, the feeding of product to the individual weigh scales can generally be coarsely metered by controlling the amplitude and duration of the excitation of the vibratory feeders. However, for bulky, irregular, non-uniform or sticky products, such as chicken parts which can clump together, the feeding of product to the weigh scales is more difficult and sometimes imprecise. For example, if chicken legs are packaged with four legs per package, generally only one chicken leg should be loaded into each scale. However, since chicken legs frequently do not advance along vibratory feeders in a fluid-like state, a scale may end up with none or sometimes three or more chicken legs. As a consequence reliance upon vibrator amplitude and duration control is not satisfactory.

It is accordingly a general object of the present invention to provide a more accurate method and apparatus for feeding products, particularly products that come in the form of sticky, irregular or non-uniform pieces.

SUMMARY OF THE INVENTION

The present invention resides in a combination weighing machine that has a plurality of weigh scales for weighing quantities of product. The scales are dumped in selected combinations, and then are reloaded in a cyclic operation to form a package or other group of products that closely approximates a targeted amount, that is, a particular number or weight of product. The machine includes a plurality of feeders and corresponding accumulators that are associated respectively with the plurality of scales for loading product into the scales after they have been dumped.

In one form, the invention includes a sensing means that is associated with the accumulator of a weigh scale for detecting the product discharged from an associated feeder into the accumulator. The sensing means produces a control signal which is indicative of the discharged product. For example, an optical sensor is disposed along the feed path followed by product as it drops from the feeder into the accumulator and produces a signal each time a piece of product passes the sensor.

Feeder control means is connected in controlling relationship with the feeder and responds to the control signal from the sensing means to regulate the operation of the feeder and generally the amount of product discharged into the accumulator. In one embodiment the feeder control means counts the number of pieces which drop into the accumulator and terminates the excitation of the feeder after a preset number of pieces have been detected. The control means may also interrupt the excitation each time a piece is detected to cause the product to fall single file into the accumulator and thus improve the accuracy of the product count.

In another form the invention relates to the method of feeding product in a combination weighing machine having the plurality of weigh scales. The method is comprised by energizing a product feeder to cause the product to be discharged from the feeder into an associated accumulator. The discharged product is detected as it falls into the accumulator and then the energization of the feeder is terminated along with the discharging of the product in accordance with the amount of the discharged product detected.

One advantage of the invention is that packages of product are more easily and more accurately formed when the feeders are controlled by detecting the pieces fed to the accumulator rather than by controlling the amplitude and duration of feeder excitation. The invention has particular utility with systems in which the piece count in the package is specified. However, the invention is also useful where the products are not uniform in size, shape or consistency and also where the products are "sticky" or do not move through the feeder with a high degree of fluidity and reliability. By controlling the feeder in accordance with the product piece count as in the present invention, the problems of the prior art are overcome and the performance of the combination weighing machine is enhanced.

BRIEF DESCRIPTION OF THE DRAWINGS

FIG. 2 is a timing diagram illustrating the scale dumping and filling operations in a single cycle of machine operation according to the prior art.

FIG. 4 is a schematic illustration of the combination weighing machine including the vibrator control and the connections with other elements of the combination weighing machine.

FIG. 5 is a schematic illustration of an optical sensor used in one embodiment of the present invention.

DESCRIPTION OF THE PREFERRED EMBODIMENTS

Figure 1:
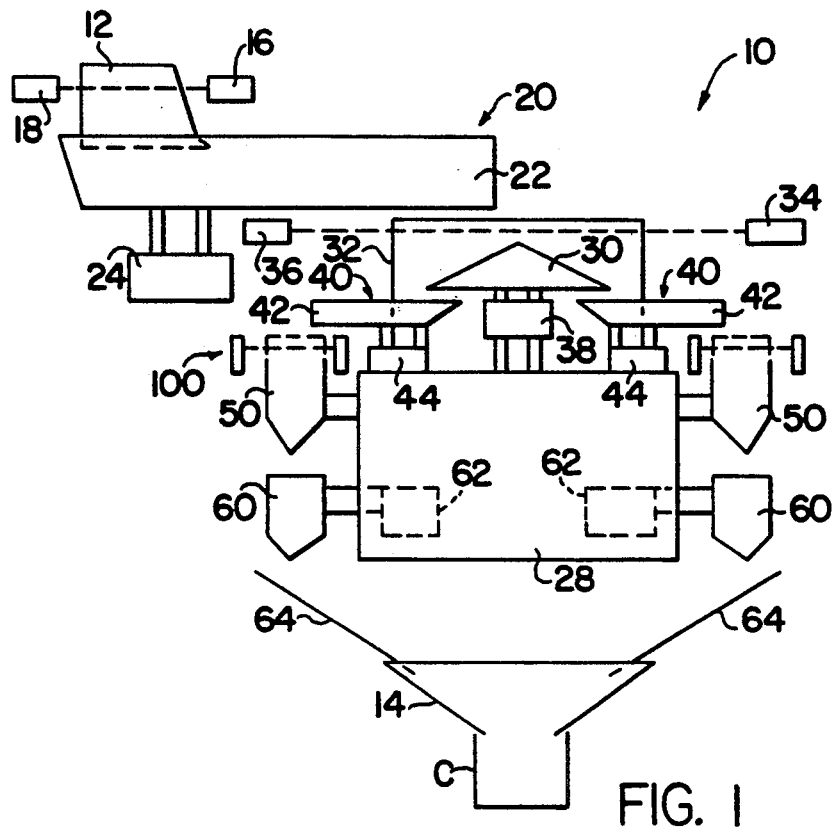
FIG. 1 is a schematic illustration of a combination weighing machine incorporating the present invention.

FIG. 1 illustrates a combination weighing machine, generally designated 10, which incorporates the present invention. The machine 10 receives product in bulk through an in-feed hopper 12 in the upper part of the machine, and discharges the product in measured amounts through a funnel 14 at the bottom of the machine to fill cartons C or to supply product to a packaging machine, such as vertical form, fill and seal machine.

A level sensor composed of a light emitter 16 and receiver 18 is mounted on the in-feed hopper 12 to insure that a constant supply of product is available in the hopper. When the product level drops below the line of sight between the emitter and receiver, a signal is sent to the bulk feeder in order to supply more product to the hopper 12. It is important to note that the controls which tend the sensor formed by the emitter 16 and receiver 18 cause the sensor to respond to the level of product in the hopper and not to the individual pieces which drop into the hopper. Such controls might include, for example, timers which introduce transients into the signals from the receiver.

Once the product has been received in the in-feed hopper, it falls immediately onto an in-feed vibrator 20 having a feed tray 22 and a vibratory drive motor 24. The tray is open at the right-hand end overlying a feed cone 30, and is slightly inclined downwardly toward the cone. When the vibratory drive motor 24 is energized and the tray 22 contains product, product gradually spills from the end of the tray onto the feed cone 30 and is captured within a retainer skirt 32. The operation of the vibratory drive motor 24 is controlled by another level sensor composed of a light emitter 34 and a receiver 36 mounted on the upper portion of the retainer skirt 32. Again like the level sensor formed by the emitter 16 and receiver 18, the level sensor formed by the emitter 34 and receiver 36 is sensitive only to the level of product within the retainer skirt 32.

The feed cone 30 is also vibrated by a vibratory drive motor 38 mounted on the machine frame 28. The vibrated cone causes product resting on the cone to flow radially outward within the retainer skirt and drop into a plurality of vibratory feeders 40 extending radially outward from the feed cone 30. Each feeder 40 is constructed in a manner similar to the in-feed vibrator 20 but on a smaller scale. A feeder 40 includes a feed tray 42 and a vibratory drive motor 44 mounted on the frame 28. The feed trays 42 are inclined downwardly toward the radially outer ends which are open for discharging product. Thus, product received from the feed cone 32 is subdivided and fed radially outward toward the discharging ends of the trays 42.

A plurality of product accumulators 50 and a corresponding plurality of weight scales 60 are mounted in circumferentially spaced relationship about the machine frame 28 and are vertically aligned respectively with the discharging ends of the vibratory feeders 40 to receive product as needed. Product discharge from the trays 42 drops into the corresponding accumulators to form a charge of product. When the associated weigh scale is dumped, the scale is immediately refilled by the charge of product in the waiting accumulator.

The weighing machine 10 operates in a cyclic fashion and discharges one measured amount of product into the discharge funnel 14 during each cycle of operation. During each cycle the weight of product in each loaded weigh scale 60 is measured by means of the weigh cells 62, and the microprocessor based machine controller (not shown) searches for that combination of scales which collectively provides the amount of product most closely approximating a target amount. That target may, for example, be a total number of product pieces or a total weight of product. For a more detailed explanation of the combination search process, reference may be had to U.S. Pat. No. 4,466,500.

The combination weighing machine 10 is set up so that less than all of the scales 60 are dumped in each cycle of operation. Accordingly, a number of loaded weigh scales generally remain after a dump operation. These remaining scales may be the subject of a further combination search and dumping operation while the previously dumped scales are re-filled. Thus the search-and-dump operation for different sets of scales may overlap in a multi-shift operation.

When the product leaves the scales 60 it passes through a corresponding plurality of discharge chutes 64 into the funnel 14. The discharge chutes merge near the upper end of the funnel 14. In order to avoid a jam-up of product or to insure uniform mixing of multi-component products, the discharge of product from the scales selected to be dumped may be staggered.

FIG. 2 is a timing diagram which illustrates the dumping and filling sequence for a given weigh scale during one cycle of machine operation in a machine constructed in accordance with the prior art. The time scale extends in the horizontal direction from left to right, and the cycle starts with weigh scale dumping during the period labeled 70. Typically the period would be 0.25 second, and during that time the previously loaded weigh scale opens, product drops from the scale toward the discharge funnel 14 and the weigh scale doors close.

The next operation in the sequence is accumulator dumping which is represented by the period 72. The duration of period 72 is also approximately 0.25 second. The period 72 overlaps the period 70 by a short lead or "anticipation time" since the accumulators 50 are located a finite distance above the weigh scales 60, and the accumulator doors can open and begin dropping product to a weigh scale before the weigh scale doors have closed.

The next operation is the energization of the vibratory feeder which is represented by the period 74. During the period 74 the vibratory drive motor 44 causes product to be fed through the tray 42 and be discharged into the underlying accumulator 50. Again since there is a vertical separation between the feeder 40 and the accumulator 50, the vibrator energization period overlaps the accumulator dump period 72 by a short "anticipation time" so that product may start dropping before the accumulator doors have closed. The duration of the vibratory feed period is variable, but is approximately 0.5 second as illustrated.

The period 76 represents the scale settling period during which the bouncing of the weigh scale due to the charge of product dumped into the scale from the accumulator settles out. Ideally the settling period should be as long as possible so that the reading taken by the weigh cell 62 is accurate and not influenced by transients following the dumping of the charge of product into the scale. As illustrated, the settling period is approximately 0.7 seconds.

The settling period 76 is followed by the weigher reading period 78 during which the weigh scale is sampled multiple times and an average value for the weight reading is determined. As illustrated the period 78 is approximately 0.1 second.

The last period in the cycle is the combination search and selection period 80 during which the weight readings from each of the scales are combined and evaluated in numerous combinations, and a specific combination is selected for dumping. The period 80 as illustrated is approximately 0.1 second.

The dotted period 82 indicates that the sampling of the weigh scale may begin at an earlier point in the machine cycle for those weigh scales that were not dumped and refilled during the previous cycle of operation. Obviously scales which are not dumped have had a much longer settling time and a more accurate weight reading can be taken during a longer sampling period.

The overall time for the cycle illustrated in FIG. 2 is approximately 1 second which is equivalent to 60 packages per minute.

Variations on the cycle illustrated in FIG. 2 might include multi-shift operation, sometimes referred to multiple dumps per refill. In such a system a second search is performed on non-selected scales before the selected scales are refilled and settled. Another variation arises when the dumping of the selected scales does not occur simultaneously but instead is spread out over a short period of time longer than the period 70 illustrated. In such situations it may be necessary to increase the overall cycle time since the last scale dumped also should be refilled to participate in the next cycle of operation.

In the prior art system illustrated in FIG. 2, the vibratory feed period 74 has a duration that is set prior to the start of the machine cycle. One such process for fixing the cycle duration is disclosed more particularly in U.S. Pat. No. 4,534,428 discussed above. Briefly the duration is set in conjunction with the vibrator amplitude so that the charge of product delivered from the vibratory feeder is approximately ⅛ to 1/5 of the targeted amount of product to be dumped by all of the selected scales. The control of vibrator duration is accomplished by an adaptive system which monitors the charge of product and periodicly adjusts the amplitude and duration of the feeder to coarsely obtain the desired charge or "feed weight".

In accordance with the present invention a second alternative means is provided for controlling the vibratory feeders, particularly the duration of the feed cycle. Instead of setting a fixed duration for the vibratory feeder operation, sensors are provided for detecting the feeding or dropping of product pieces from the vibratory feeders into the accumulators. Such a system is superior to the prior art system when the product being weighed is difficult to feed or consists of pieces which vary widely in their range of weight. The invention is also especially useful in piece count systems where the weight of product is converted into an estimated piece count and the combinations are selected primarily based upon the number of pieces in the scales. For example, chicken parts are frequently packaged with a specified number of pieces in each package and ideally the pieces should collectively have a desired packaged weight. Chicken parts are also difficult to feed especially if they are not breaded because they tend to stick together or to the sides of the feed trays.

By controlling the vibratory feeders 40 in accordance with the number of product pieces dropped into an accumulator, generally designated "feed count", rather than a fixed time period, a far superior and more accurate weight or product count can be obtained in resulting package.

Figure 3:
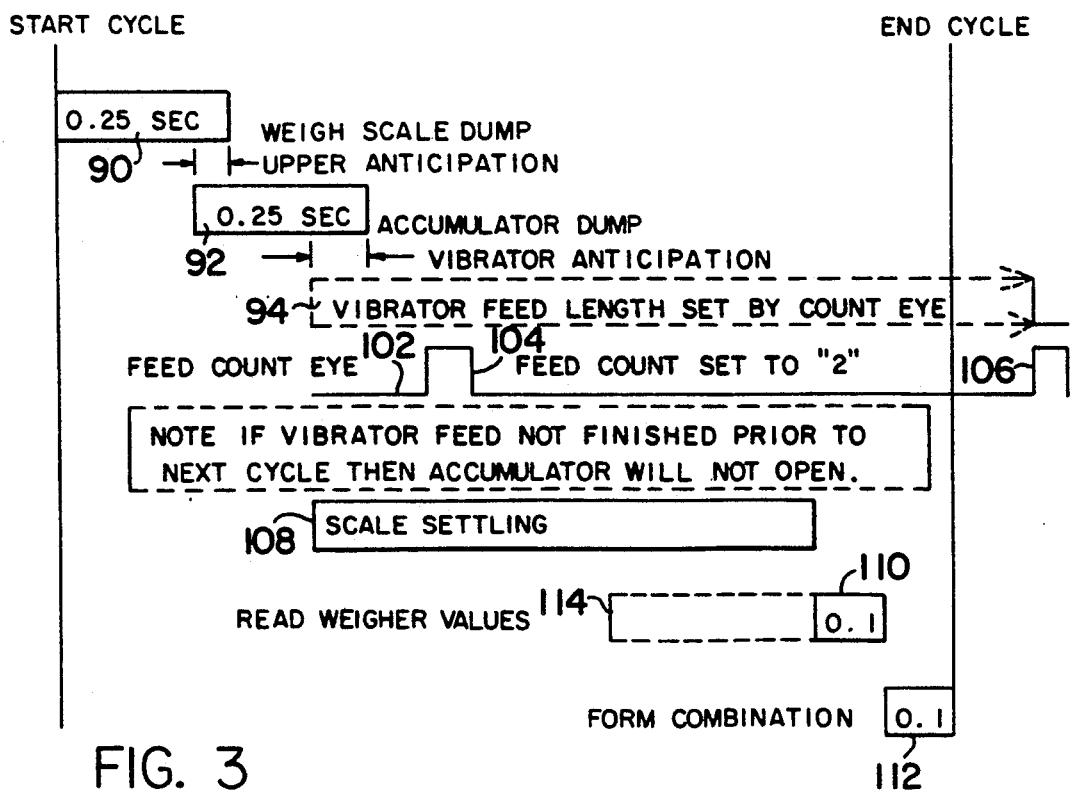
FIG. 3 is a timing diagram illustrating the scale dumping and filling operations in a single cycle of operation in accordance with the present invention.

FIG. 3 is a timing diagram which illustrates the various operations in a machine where product feed is controlled by means of a feed count sensor in accordance with the present invention. As in the conventional feeding process illustrated in FIG. 2, the cycle starts with a period 90 in which a weigh scale 60 is dumped and a following period 92 in which the associated accumulator dumps a previously formed charge of product into the empty weigh scale. As previously described, the periods 90 and 92 are both approximately 0.25 seconds and overlap one another by a short anticipation time in view of the vertical separation between the accumulator and weigh scale.

The accumulator dump period 92 is followed by a feed period 94 in which the vibratory feeder 40 is energized to drop a charge of product into the now-empty accumulator 50. The period starts again with a slight anticipation time in view of the vertical separation between the feeder tray 42 and the accumulator, but the period is of indeterminate duration. Instead of controlling the duration in accordance with a set or calculated time, a sensor 100 shown in FIGS. 1, 4 and 5 is provided to detect product dropped into the accumulator 50 from the vibratory feeder 40. When the predetermined number of product pieces have been detected by the sensor, the vibratory feeder 40 is shut off.

The sensor 100 which detects "feed count" offers several advantages. Products, such as chicken parts, which are difficult to feed and vary widely in piece weight can be fed more accurately. For example, if the product pieces do not fall from the feeder tray 42 because the product is stuck or jammed in the tray, the vibratory feeder will continue to operate and attempt to free the jam under the control of the sensor 100. In the prior art systems where the vibratory feeder excitation was controlled by time, delivery of jammed product may not take place at all during the scheduled feed time, or if the pieces cling together, multiple pieces may move through the accumulator in a very brief period of time. The result may be either no pieces of product in the accumulator or a very large charge of product in the accumulator. If no pieces are in the accumulator, then the weigh scale 60 receives no product in the next refill operation and in effect the number of combinations from which a package of product can be formed is reduced by a factor of 2. Correspondingly, a weigh scale having an excess charge of product, for example, 85% of the target weight, may be difficult to combine with other scales to form a preferred combination and, therefore the useful combinations are again reduced.

The period 94 during which the vibratory feeder is operated is illustrated by dotted lines in FIG. 3 to indicate that the duration of the period is indeterminate or variable since it depends upon the actual dropping of product pieces into the accumulator. If the preset number of pieces are not detected by the sensor 100 during the scheduled vibratory feed period, which can extend into the next cycle of the machine as illustrated in FIG. 3, then the accumulator does not open and the feed operation is initiated again at the same time during subsequent cycle. However, several alternatives are available. In the first alternative, the excitation of the vibratory feeder 40 may continue indefinitely until the sensor 100 detects the preset number of product pieces. In addition or as a further alternative, a warning signal indicative of a jam or obstruction in the feed tray may be generated so that the machine can be stopped and the operator can free product in the feed path to allow the accumulator and associated scale to again join in the weighing and dumping process.

The sequence of events illustrated in FIG. 3 indicates that the controls for the vibratory feeder are set to a feed count of 2, that is, two pieces of product must be detected before the vibratory feeder is de-energized. The signal from the sensor 100 in such a case is illustrated by the graph 102 in which the pulse 104 represents the detection of the first product piece and the pulse 106 represents detection of the second product piece. It will be observed that the period of vibrator excitation terminates simultaneously with the detection of the second product piece falling into the accumulator. In the illustrated sequence of events, the scale 50 associated with the vibratory feeder would not be dumped during the next cycle of operation since the second product piece did not drop until after the weigh scale settling period 108 and the weigh scale reading period 110 had ended. Ideally the product feeding would not be so difficult and the second product piece would fall during the scale settling period 108. The scale would be read during the period 110, approximately 0.1 second, and would be included in the combination search during the search period 112, also approximately 0.1 second. The dotted period 114 associated with the read period 110 identifies the expanded period during which a scale not selected in the previous cycle of operation can be read.

One embodiment of the invention incorporating a feed count sensor is illustrated in FIGS. 4, 5 and 6A-D.

FIG. 4 illustrates the connections between the vibrator control 120 and the other elements of the weighing machine. Although the control 120 is shown connected with one vibratory feeder, one sensor 100 and a corresponding weigh scale 60, the control actually has one channel for each set of the feeders, sensors and associated scales. The operation of each channel is the same.

The sensor 100 sends a signal to the vibratory control 120 each time a piece P of product drops from the feeder tray 42 into the accumulator 50. In one form, the sensor 100 is an optical sensor comprised by an emitter 122 mounted above the maximum fill point in the upper portion of the accumulator at one side and a light receiver 124 mounted in the upper portion of the accumulator at the opposite side. In one embodiment the emitter sends out multiple parallel beams of infrared light 126 as illustrated in FIG. 5. The emitter 122 and receiver 124 are arranged directly opposite one another so that all of the beams of light lie generally in the same horizontal plane 128 (FIG. 4) and are received respectively by diodes in the receiver 124. The diodes are connected in parallel so that the interruption of any one beam of light by a product piece falling into the accumulator sends out a pulse signal to the vibrator control 120.

It is possible for several pieces of product to be stuck together and appear to be a single piece of product falling through the light beams 126. In that event a false count is generated and the vibratory control may cause the vibratory feeder to continue to feed and add one or more pieces to the accumulator than was detected. However, a sensor made by Banner Engineering Corp. of Minneapolis, Minn. can measure pieces as small as 0.1" with a separation as little as 40 milliseconds (0.04 seconds). With such accuracy the signal from the sensor is generally indicative of the number of pieces falling into the accumulator. The limited incidences when an erroneous count is generated does not effect the overall accuracy of the weighing machine output since the feed count signal is limited to controlling product feed, and the weight signal from the weigh scale 60 is utilized to determine the dump combination.

The vibratory control is preferably implemented as a software sub-routine within a microprocessor based machine controller. FIGS. 6A-D comprise a flowchart illustrating an exemplary sub-routine for controlling the feeding of product from one vibratory feeder 40 into the associated accumulator 50.

The feeder control sub-routine is entered at 130 and first determines at branch 132 if the associated weigh scale has been selected for dumping during the current cycle of machine operation. If not the sub-routine is exited at 134.

If the associated scale has been selected for dumping, the sub-routine at branch 136 determines if the feed count option of the present invention has been selected by the machine operator instead of the prior art process of timing the feed period (FIG. 2). If the prior art process has been selected, then the sub-routine skips to a set of instructions 138 governing the prior art process of feeder control as defined more specifically in U.S. Pat. No. 4,534,428. Abbreviated instructions 138 for the prior art process are found in FIG. 6D.

If the feed count technique of controlling the vibratory feeders 40 has been selected, the program advances from branch 136 to branch 140 to determine if a counter has been started to count the number of product pieces detected by the sensor 100. The vibrator control sub-routine is processed periodically (in time slices), for example every 20 milliseconds, in accordance with the machine program, and, therefore, the first time that the sub-routine is entered during a machine cycle in which the scale is dumped, the piece counter is not started. Accordingly the sub-routine advances from branch 140 to branch 142 where the preset count set by the machine operator is examined to determine if the count is 0, and if so then the operator obviously does not intend the piece count system to function and the program skips to a set of instructions 144 in FIG. 6D which allow the vibratory feeder control sub-routine to be exited.

Assuming, however, that the feed count technique is to be used, the program advances to instruction 146 and sets the counter to a preset value, for example 2, which represents the number of pieces which are to be loaded into the accumulator during this feed cycle. The counter is also started, which means that the counter is enabled to respond to the sensor 100, and decrements with each product piece detected.

The program then advances to branch 148 and examines the sensor to see if product has been detected. If product is detected in the first pass through the sub-routine, it would be due to the fact that the product is hanging from the feed tray 42 in front of the sensor since the vibrator 40 has not been started. The hanging product would indicate a problem which is attacked as explained further below by advancing the program to a set of instructions 150 beginning in FIG. 6B.

Assuming, however, that no product is hanging from the feeder tray, the program advances to instruction 152 to start the vibrator 40 and begin feeding product. At the same time a timer is started for detecting a jam which interrupts the flow of product in the product feed path to the accumulator.

The program then advances to branch 154 and reads the sensor 100 to determine if product has been detected following the start of the vibrator operation. If no product has been detected because it has not yet fallen from the feed tray, the program advances to branch 155 and examines the jam timer to see if the time has expired. The jam timer is generally set to a time longer than a machine cycle and signals that product is jammed following the end of the machine cycle if no product has been dropped. In that event the program sends a warning or "jam" signal at instruction 156 and the program is exited at 158.

Figure 6A:
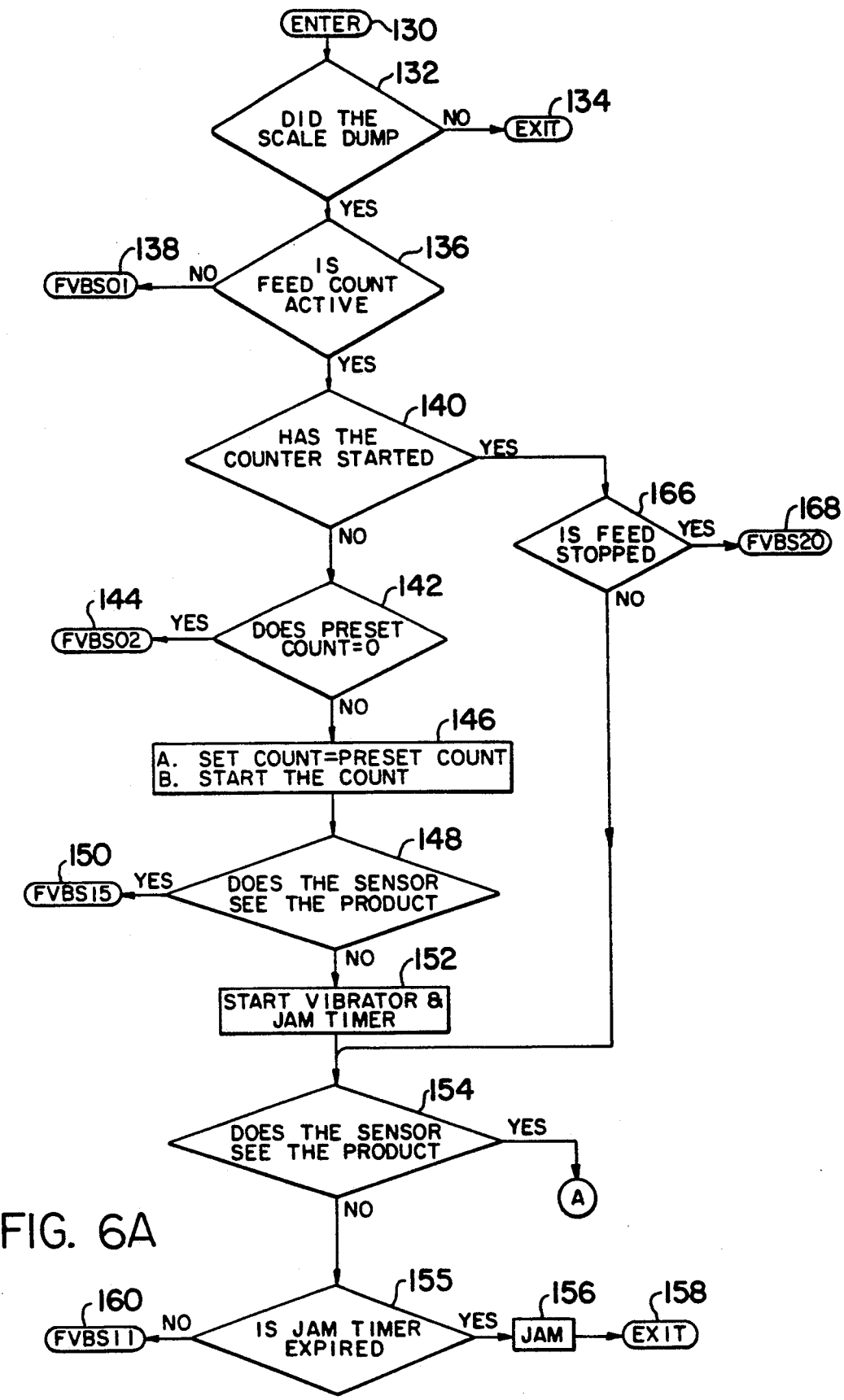
FIGS. 6A-D comprise a program flowchart detailing a feeder sub-routine in the vibrator control of the combination weighing machine.
Figure 6C:
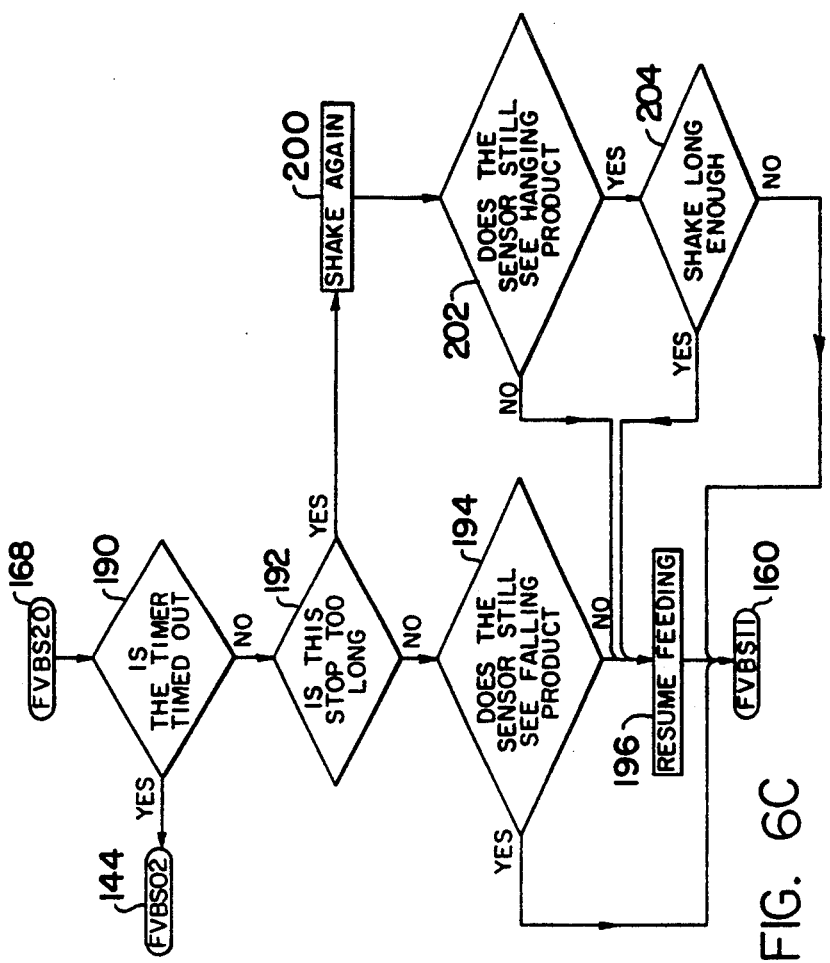
Figure 6B:
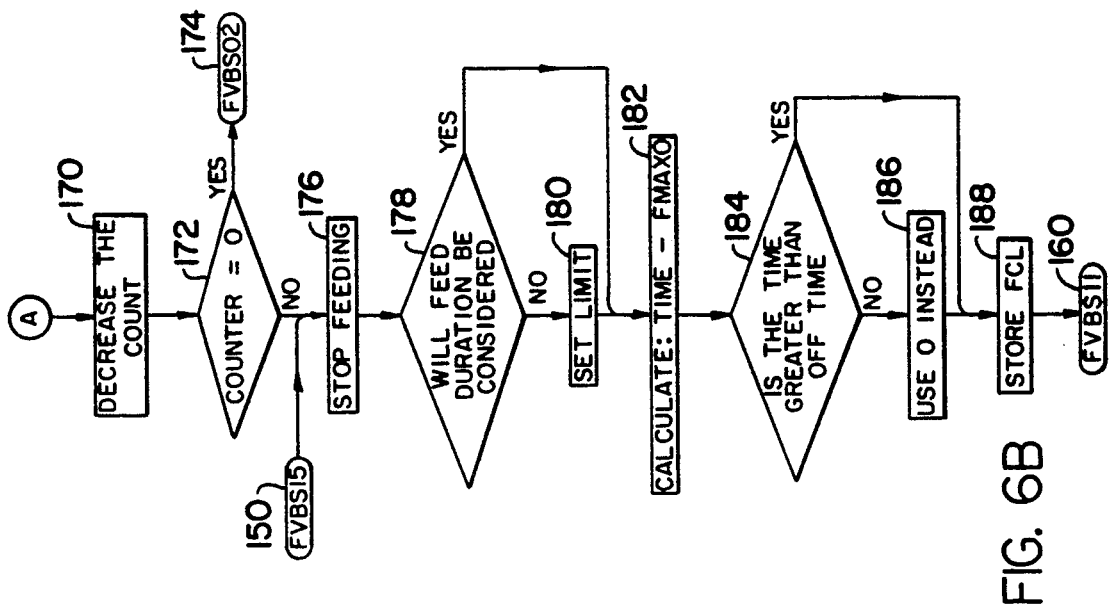
Figure 6D:
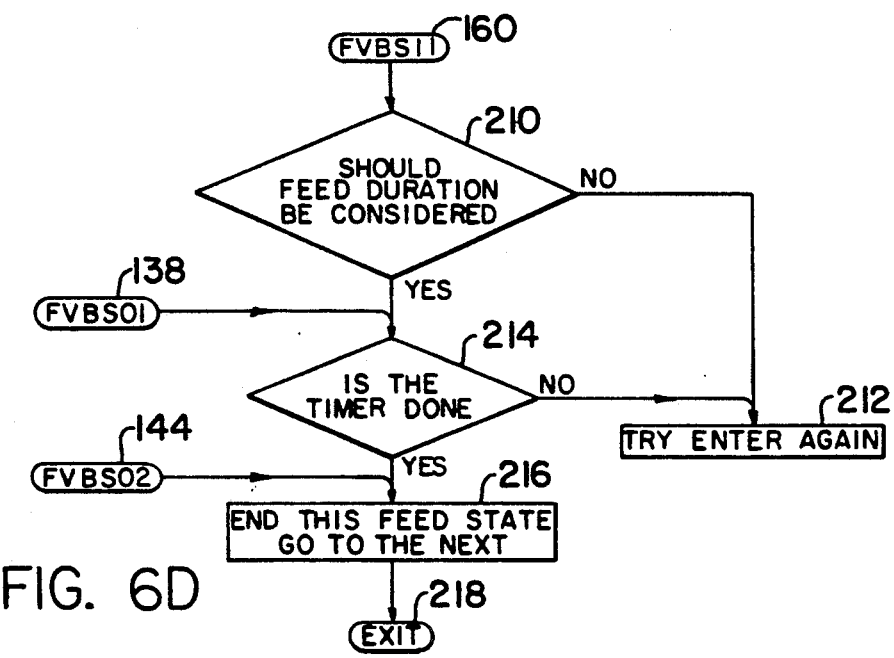

If the jam timer has not expired, the program advances from branch 155 to a set of instructions at 160 which are shown and described more particularly in conjunction with FIG. 6D.

During the next scan of the sub-routine in FIG. 6A after the counter and vibrator have been started, the program advances from branch 140 to branch 166 and determines if the vibratory feeder has been stopped. If the feeder has stopped, the program skips to a set of instructions 168 which begin in greater detail in FIG. 6C. Assuming that the feeder has not stopped, the program advances to branch 154 and again examines the sensor to see if product has been detected. Eventually during one pass through the branch 154, a product piece will be detected by the sensor unless a jam has occurred. When a product piece is detected, the program advances through point A to the continuation of the program illustrated in FIG. 6B. Since one piece of product has been detected, the counter is decremented by one at instruction 170. For example, if the counter had been preset to "2" to load two pieces of product in the accumulator, the first detected product piece would decrement the counter to "1" and then advance to branch The next product piece would decrement the counter from "1" to "0" and thus at branch 172, the program would skip to the set of instructions 144 which are described further below in connection with FIG. 6D.

Assuming, however, that the counter is decremented to "1", the program advances to the instruction 176 which stops the energization of the vibrator. The purpose of stopping the vibrator after a piece has been detected is to separate the product pieces from one another in the stream falling from the feeder. Thus the product pieces are caused to fall single file into the associated accumulator. Stopping the vibrator and spreading the pieces in a single file facilitate more accurate reading of the product feed count.

At this point in the program a safety timer is set to limit the maximum duration of the feed portion of the machine cycle and a second time is calculated for restarting the vibratory feeder. Accordingly, the program advances to branch 178 and determines if a maximum duration for the feed portion of the cycle has been set. If the answer is "YES", the program skips the instruction at 180, and if not, the feed cycle timer is set at the maximum desired duration of the feed cycle. The program then advances to instruction 182 where a calculation is performed to determine the running time at which the vibrator operation should be resumed following the detection of a product piece. The calculation is performed by subtracting the maximum off-time (FMAXO) from the actual running time. The timer is then examined at branch 184 to determine if the remaining time is greater than the off-time, and if so, the instruction 186 is skipped and the running time at which the vibrator operation should be resumed is stored at instruction 188. If the remaining time is less than the maximum off-time, then according to the instructions 186, the stored time is 0 seconds. The program then advances to the instructions 160 which are shown in FIG. 6D.

If a product piece has been detected and the feeder has been stopped at instruction 176, the program at branch 166 in FIG. 6A advances to the instructions 168 shown in FIG. 6C. If the feed cycle timer set at instruction 180 is timed out, then the program advances from branch 190 to the instructions 144 shown in FIG. 6D. If the timer is still running, which indicates that the feed cycle is not complete, the program advances to branch 192 and determines if the off-time for the vibrator has run out. If the sub-routine is examined every 20 milliseconds and a typical off-time is 0.15 seconds, the subroutine will pass through this branch a number of times before the off-time runs out. If the off-time has not been exceeded, the program advances to branch 194 and examines the sensor 100 to see if product is still detected. If product is still seen by the sensor, the program advances to instruction 160 shown more particularly in FIG. 6D and may return to branch 194 several times until the product eventually disappears from the sensor view. The program then advances to instruction 196 which resumes energization of the vibrator for dropping another product piece. The sub-routine is processed again and again as pieces fall in front of the sensor, and the vibrator is turned on and off with each detected product piece.

If product becomes hung up in front of the sensor, the product is detected at branch 194, and the program continues to loop through the sub-routine without resuming the energization of the vibrator. During one of the passes through the sub-routine, the off-time for the vibrator would be exceeded and the program then advances from branch 192 to instruction 200 which causes the vibrator to be re-energized for a short period of time. The sensor 100 is then examined at branch 202 to see if the product has been shaken loose. If the product has been shaken loose, the program immediately advances to instruction 196 and the system resumes normal feeding. If the product has not been shaken loose, the program advances from branch 202 to a second branch 204 to determine how long the vibrator has been running without dropping the hung-up product. If the maximum run time has not been exceeded, the program loops through instructions 16? and returns to the branch 204 until such time as a preset run time for loosening hung-up product has been exceeded. At that point the program gives up and resumes normal feeding at instruction 196.

The section of the sub-routine illustrated in FIG. 6D pertains primarily to the end of the feed cycle. This portion of the sub-routine is entered at instruction 160 from various stages of the sub-routine and determines first at branch 210 if a maximum feed duration has been set. Assuming that it is not because feed is controlled entirely by the feed count sensor 100, the program advances to instruction 212 which returns the program at the beginning of the next time slice to the entry point of the sub-routine in FIG. 6A. If the maximum feed duration is to be considered, the program advances to branch 214 and determines if the timer for duration has timed out. If not, again the program circulates to the entry point through instruction 212, but if the timer has elapsed, the program advances to instruction 216 which ends the feed portion of the machine cycle. The sub-routine is then exited at 218. As indicated, the feed portion of the cycle may also be terminated by entering the sub-routine at 138 and 144 from various other stages of the sub-routine described above.

While the present invention has been described in a preferred embodiment, it should be understood numerous modifications and substitutions can be made without departing from the spirit of the invention. For example, the invention may be used with all types of feeders and sensors for detecting product moved by the feeders. The sensor need not be mounted on the accumulator 40 but may be mounted on the feeder tray 42 or at any position along the feed path between the tray and the lower portion of the accumulator. The feed trays or chutes ideally should be shaped to separate the product in individual pieces for ease of detection and counting. The invention may also be employed in a machine having double shift operation and in machines with and without spreading of scale dumping. The jam detection system can be operated by a timer as disclosed or a cycle counter for measuring the time period in which no product pieces are detected after the vibrator is energized.

Accordingly, the present invention has been described in a preferred embodiment by way of illustration rather than limitation.

We claim:

1. A combination weighing machine having a plurality of weigh scales for weighing quantities of product, the scales being selectively dumped and loaded in a cyclic machine operation to form a package containing a number or weight of product at or closely approximating a target amount, including a plurality of feeders and corresponding accumulators disposed below the feeders to receive falling product, the accumulators being associated respectively with the scales for loading the received product into the scales comprising:

sensing means associated with the accumulator of a weigh scale for detecting product discharged from the associated feeder during the fall into the accumulator and producing a control signal indicative of the discharged product; and feeder control means connected in controlling relationship with the feeder to operate the feeder for an indeterminate period during a cycle of machine operation, the control means also being responsive to the control signal of the sensing means for terminating the indeterminate period of feeder operation and the discharging of product into the accumulator for preparation of a charge of product for the associated scale.

2. A combination weighing machine as defined in claim 1 wherein the sensing means comprises a sensor for detecting product pieces dropping from the feeder into the associated accumulator and producing a signal generally indicative of each piece dropped.

3. A combination weighing machine as defined in claim 2 wherein the feeder control means includes means responsive to the signal from the sensing means for counting the product pieces dropped and for terminating feeding from the feeder when a selected feed count is reached.

4. A combination weighing machine as defined in claim 2 wherein the feeder control means is connected to the feeder to momentarily interrupt feeding after each product piece is dropped to generate a single file flow of product into the accumulator.

5. A combination weighing machine as defined in claim 1 wherein the sensing means is an optical sensor.

6. A combination weighing machine as defined in claim 5 wherein the optical sensor is located along the feed path of the product between the discharge point of the feeder and the maximum fill point of the accumulator.

7. A combination weighing machine as defined in claim 6 wherein the optical sensor includes a light emitter at one side of the feed path and a light receiver at the other side of the path opposite from the emitter.

8. A combination weighing machine as defined in claim 1 further including:

means for generating a warning signal in the event that the sensing means does not detect discharged product within a predetermined time.

9. A combination weighing machine as defined in claim 8 wherein the means for generating a warning signal includes a clock for measuring the lapse in time.

10. A combination weighing machine as defined in claim 8 wherein the means for generating a warning signal includes a means for detecting a predetermined number of machine cycles.

11. A combination weighing machine having a plurality of weigh scales for receiving quantities of product to be weighed and combined in selected combinations to form targeted amounts of product, and a plurality of vibratory feeders disposed above corresponding accumulators to drop product into the accumulators, the accumulators being associated respectively with the plurality of weigh scales for feeding product to the scales as needed, comprising:

a vibrator control having a vibrator control channel associated with a vibratory feeder for controlling the operation of the feeder at selected times during the machine operation to feed product from the feeder into the corresponding accumulator, the control channel having means for initiating the operation of the feeder in response to a need for product and means for terminating the operation of the feeder in response to the detection of product dropping from the feeder to the accumulator whereby the amount of product fed to the accumulator and associated scale is precisely controlled.

12. A combination weighing machine as defined in claim 11 wherein the means for terminating in the vibrator control channel includes:

sensing means located along the product feed path from the vibratory feeder into the corresponding accumulator for detecting product dropping along the path into the accumulator.

13. A combination weighing machine as defined in claim 12 wherein the sensing means is an optical sensor.

14. A combination weighing machine as defined in claim 11 wherein the means for terminating the operation of the vibratory feeder is responsive to the detection of a selected number of product pieces dropped from the feeder.

15. A combination weighing machine as defined in claim 14 wherein the means for terminating includes a resettable counter connected with the sensing means for counting number of product pieces dropped.

16. A combination weighing machine as defined in claim 11 further including means for momentarily interrupting the feeding of product as each piece of product dropped is detected whereby a single file of product is fed.

17. A combination weighing machine as defined in claim 11 wherein the vibrator control channel includes further means for selectively terminating the operation of the feeder a set time duration after starting the operation of the feeder, and means for enabling one or the other of the terminating means.

18. A method of feeding product in a combination weighing machine having a plurality of weigh scales which receive product from a corresponding plurality of feeders and associated accumulators for weighing and combining product in amounts closely approximately a predetermined target amount comprising:
  positioning the feeders above the associated accumulators to permit product to drop along feed paths between the feeders and associated accumulators;
  energizing a feeder to cause product to be discharged from the feeder and drop along the feed path into the associated accumulator;
  detecting pieces of product being discharged from the feeder into the associated accumulator while the pieces are dropping along the feed path to establish the amount of product discharged; and
  terminating the energizing of the feeder and the discharging of product in accordance with the pieces of discharged product detected.

19. A method of feeding product in a combination weighing machine as defined in claim 18 wherein:
  the step of terminating includes terminating the energizing and discharging of product in accordance with the number of pieces of product detected.

20. A method of feeding product in a combination weighing machine as defined in claim 17 wherein an additional step includes momentarily interrupting the energizing and discharging of product from the feeder with each piece of product detected to separate the discharged product pieces in a single file.

21. A method of feeding product in a combination weighing machine as defined in claim 16 wherein an additional step includes momentarily interrupting the energizing and discharging of product from the feeder with each piece of product detected to separate the discharged product pieces in a single file.

* * * * *